LEEDS & VAUX.
Steam Heater.

No. 28,493.

Patented May 29, 1860.

Witnesses:

Inventors:
Lewis W Leeds
Calvert Vaux

UNITED STATES PATENT OFFICE.

LEWIS W. LEEDS AND CALVERT VAUX, OF NEW YORK, N. Y.

STEAM-HEATING APPARATUS.

Specification of Letters Patent No. 28,493, dated May 29, 1860.

*To all whom it may concern:*

Be it known that we, LEWIS W. LEEDS and CALVERT VAUX, both of the city, county, and State of New York, have invented a new and useful Improvement in Apparatus for Warming Buildings or Apartments by Steam; and we do hereby declare that the following is a full, clear, and exact description of the same, reference being had to the accompanying drawings, forming part of this specification, in which—

Figure 1:
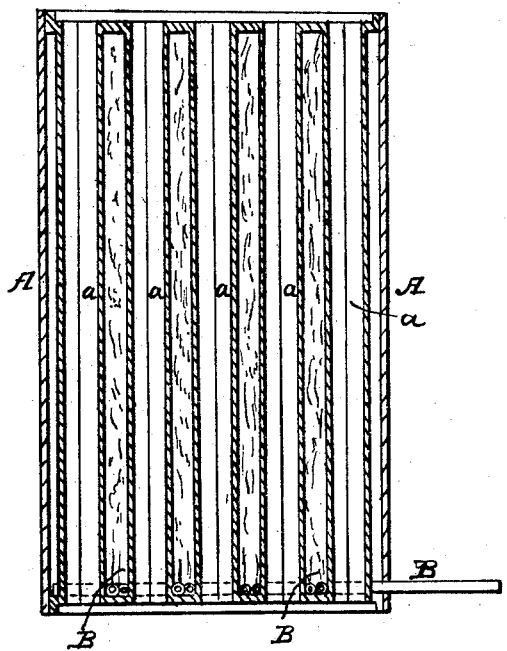
Figure 2:
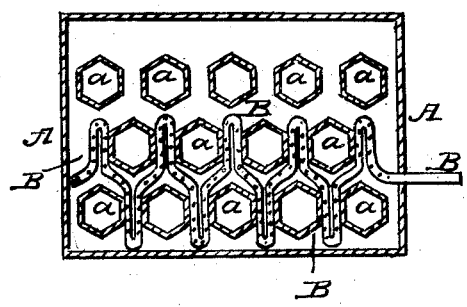

Figure 1 is a vertical section of a heating apparatus illustrating our invention. Fig. 2, is a horizontal section of the same.

Similar letters of reference indicate corresponding parts in both figures.

The object of our invention is to employ steam for warming buildings at a pressure as much below that of the atmosphere or as little above it as may be desirable, and at the same time to obtain an equal distribution of the steam to all parts of a heater or radiator, thereby obtaining a very considerable range of temperature as in the use of water as the warming medium, and a uniformity of temperature of all parts of the warming surface; and to this end our invention consists in the admission of the steam to the heater or radiator by means of numerous perforations, very fine slits or other narrow openings so arranged as to deliver it into the heater at or very near the bottom thereof and at all parts of its horizontal area in very thin jets or streams or in other words in a monutely divided state by which we cause its uniform diffusion throughout all parts of the interior and over all parts of the warming surfaces.

To enable others skilled in the art to make and use our invention we will proceed to describe it with reference to the drawings.

The heater represented consists of a box A, having a number of upright open air tubes *a, a,* extending right through it, but it may be of other form.

B, is the pipe for the admission of steam from the boiler, entering the heater at or near the bottom and taking a circuitous course near to and over a large portion of the bottom, and having throughout the whole length of that portion which is within the heater, numerous perforations for the admission of the steam to the heater only in fine jets. One or more of these pipes may be used, and in a heater of considerable size it may be desirable to use several to obtain a uniform diffusion of steam throughout all parts of its interior. Each pipe B, is to be furnished with a cock or valve by which the admission of steam may be regulated so that a much less pressure may be kept up in the heater than in the boiler in which the steam is generated. The steam being thus admitted at the bottom of the heater in a minutely divided state cannot fail to be diffused throughout the whole of the interior and to heat all parts alike, and this will be the case no mater how small the quantity admitted even though the pressure in the heater be lower than the pressure of the atmosphere. It is, in thus obtaining a uniform low temperature in all parts of the heater that the advantage of our invention consists. This result cannot be obtained by the admission of a small supply of steam at a single opening, as it is by the simple steam pipe commonly used for supplying steam heaters; for the tendency of steam is always to rise to the top of a vessel in which it is confined, and when admitted at a single opening it rises in a regular stream and collects at the top heating the upper part and leaving the lower part cool.

The box A, should be furnished with a suitable trap for the escape of the water of condensation.

We do not claim the admission of steam by means of a perforated pipe among water or liquid substances for the purpose of heating or boiling them; but

What we claim as our invention and desire to secure by Letters Patent, is—

The admission of the steam at or near and over all parts of or a great portion of the bottom of a steam heater in numerous thin jets or streams or in other words in a divided state, by a perforated pipe or its equivalent substantially as herein described whereby an equable diffusion in any quantity may be effected through the whole of the heater for the purpose herein specified.

LEWIS W. LEEDS.
CALVERT VAUX.

Witnesses:
WM. THOMPSON,
CHAS. CRUX.